Jan. 8, 1952     R. L. SIMPSON     2,582,171
SAFETY DEVICE
Filed Dec. 29, 1945
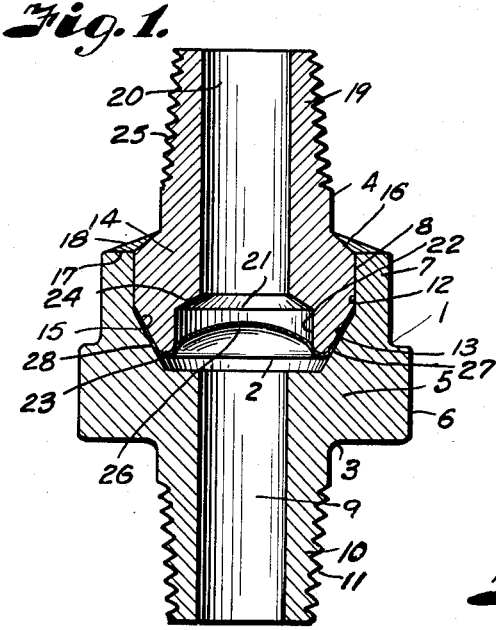
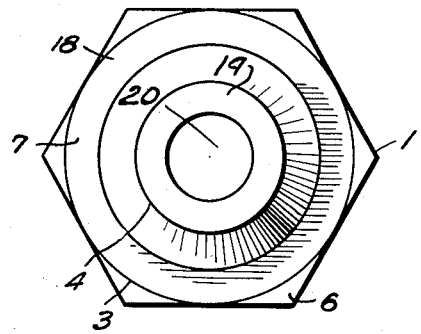
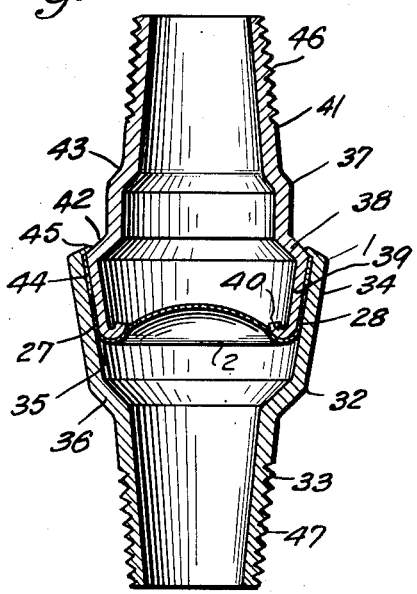
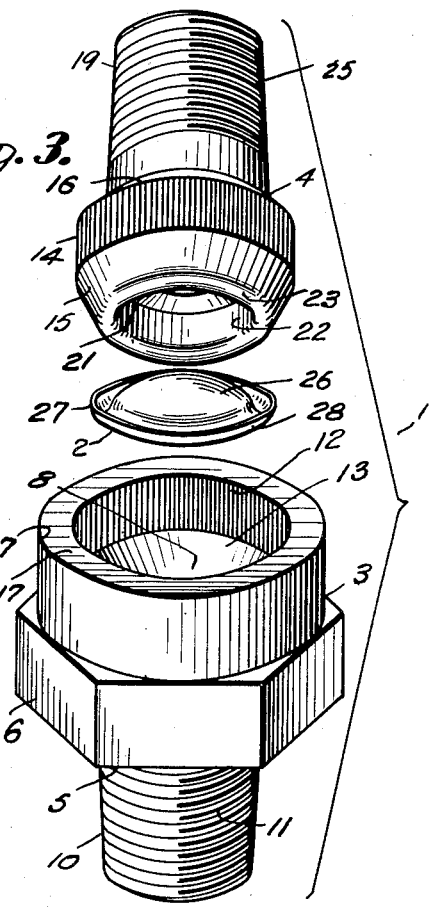
INVENTOR
Roy L. Simpson
BY
Fishburn & Mullendore
ATTORNEYS Patented Jan. 8, 1952

2,582,171

UNITED STATES PATENT OFFICE 2,582,171

SAFETY DEVICE

Roy L. Simpson, North Kansas City, Mo., assignor to Black, Sivalls & Bryson, Inc., Kansas City, Mo., a corporation of Delaware Application December 29, 1945, Serial No. 638,200

3 Claims. (Cl. 220—89)

1

This invention relates to safety devices for relieving excessive pressure differentials between high and low pressure sides of an apparatus such as refrigerating equipment, hot water heaters, boilers and the like and has for its principal object to provide a device of this character equipped with a rupture member and which is capable of being factory assembled to form a sealed unit that may be readily installed without danger of alteration in the rupture pressure for which the disk is designed.

Further objects of the invention are to provide an assembled unit wherein the rupture member is securely sealed in position and inaccessible for separate replacement or for any alteration that might result in an unreliable safety device when installed for a given purpose.

Other objects of the invention are to provide an inexpensive unit so that it may be disposed of and replaced by a new unit; and to provide a device that is readily assembled and the parts sealed together for retaining the rupture member.

In accomplishing these and other objects of the invention, I have provided improved structure, the preferred forms of which are illustrated in the accompanying drawing wherein:

Fig. 1 is a vertical section through a safety unit constructed in accordance with the present invention.

Fig. 2 is a plan view of the unit.

Fig. 3 is a perspective view of the parts of the unit shown in related spaced relation prior to assembly of the unit.

Fig. 4 is a vertical section through a modified form of the invention.

Referring more in detail to the drawings:

1 designates a safety device constructed in accordance with the present invention and which in the form illustrated is especially adapted for connection in a duct leading to the high and low pressure sides of an apparatus to be protected such as a mechanical refrigerating apparatus.

The device is constructed as a unit and includes a rupture member 2 sealed between a pair of interfitting members 3 and 4. The member 3 includes a body 5 having a polygonal-shaped mid portion 6 whereby the unit is adapted to be supported by a wrench when it is to be installed in an apparatus to be protected. Extending coaxially from one side of the mid portion 6 is an annular flange or collar 7 forming a socket-like recess 8 coaxial with a bore 9 extending through a neck 10 at the opposite side of the wrench engaging portion 6. The neck 10 may be provided with threads 11 or other fastening means by which it may be connected into the apparatus to be protected. The recess 8 has an annular circumferential face 12 which joins with an annular inwardly tapering seat 13 which encircles the bore 9, as shown in Fig. 1. The member 4 has a cylindrical head 14 of a diameter adapted to be interfitted within the socket 8 to engage the annular face 12. Formed on the outer end of the head is an annular tapering seat 15 corresponding with the seat 13 to engage and anchor the rupture member as later described. The opposite side of the cylindrical portion 12 has a tapered shoulder 16 that cooperates with the end face 17 of the collar 7 to form an annular groove for containing a sealing material such as solder 18 if desired. The member 4 also includes a coaxial neck portion 19 having an axial bore 20 adapted to register with the bore 9 and which connects with an enlarged recess 21 opening inwardly from the outer end of the head to accommodate the rupture portion of the diaphragm.

The recess 21 includes an annular face 22 that connects with the tapered seat 15 in a smoothly rounding curve 23. The recess 21 is connected with the bore 20 through a funnel-like throat 24 to facilitate relief of pressure upon functioning of the rupture member now to be described. The neck 19 may also be externally threaded as at 25 or otherwise providing a means of attachment.

The rupture member 2 is preferably of the type disclosed in the Gwynne Raymond patent on "Safety Device for High Pressure Vessels," No. 1,930,960 of October 17, 1933 and includes a substantially dome-shaped rupture portion 26 positioned within the recess 21 and which has an annular rim 27 corresponding in curvature to the rounding face 23 of the member 4 and which terminates in a flaring portion 28 clampingly engaged between the tapered seats or gripping faces of the members 3 and 4 as shown in Fig. 1. The rupture member is formed of a material of thickness and shape so that it will rupture when differential of pressures on the respective sides thereof reach a predetermined high value.

In order to prevent turning of one of the members in the other and assure a positive grip on the flange of the diaphragm, the inner face portion 8 of the socket and the gripping annular portion of the head 14 may be knurled or otherwise suitably formed (Fig. 3) to interlock securely the members together when they are pressed together or the interfitting portions of the members 3 and 4 may be left smooth and secured tightly together with solder.

In assembling the unit, the crown portion of the rupture member is inserted in the recess 21 with the curving portion thereof fitting against the rounding portion 23 of the head 14 with the flaring portion 28 embraced by the seat 15. The members 3 and 4 are then placed together with the head on the member 4 entering the socket-like recess of the member 3 to firmly clamp and wedge the rim of the diaphragm therebetween and form a pressure-tight closure between the bores 9 and 20 of the respective members. The knurling on the annular faces prevents twisting and separation of the members; however, to assure a positive and permanent seal, the joint between the members may be covered with solder 18 or similar sealing material. When solder is relied upon to make a seal, the interfitting faces of the members may be formed with a slight clearance as in the modification of the invention illustrated in Fig. 4, later described.

With the diaphragm in position, the rupture portion thereof is freely supported without internal stresses or strains which might alter the rupture pressure for which the member is designed.

The safety device as assembled is used as a unit and may be readily connected with the apparatus to be protected without danger of disrupting or in any way altering the rupture pressure of the diaphragm. With the structure described, the diaphragm is assured of functioning at its calculated pressure and when in use provides a positive and safe device for protecting the equipment with which the unit is connected. The form of invention just described is suitable for machining or molding.

The form of invention shown in Fig. 4 is especially adapted for formation of the fittings by means of drawing dies or with slight modifications as suggested in the first form of the invention, they may be formed on a screw machine. In this form of the invention the member 32 includes a neck portion 33 having an outwardly flaring annular wall portion 34 provided with an inner tapering face 35 to engage and seat the flaring portion of the circumferential flange of the rupture member. The flaring portion of the member may join with the neck portion 33 in a swage portion 36. The member 37 has a head 38 formed by an inwardly tapering wall portion 39 corresponding in taper to the wall portion of the member 32. The rim of the wall portion 39 terminates in an inwardly curving face which may be provided by a flange 40 adapted to seat within the curving portion of the rupture member and form a backing therefor and assuring adequate support of the rupture member.

The wall portion 39 may join with the neck portion 41 of the member 37 in inwardly swaged portions 42 and 43. In this form of the invention, the members when pushed together have slight clearance therebetween for solder as indicated at 44. With the parts held firmly and with proper solder and temperature, the solder will flow filling the clearance space and give the joint ample strength. If desired, the peripheral edge of the wall portion of the member 32 may be spun over the swage portion 42 of the member 37 as indicated at 45. The neck portions 33 and 41 of the members 32 and 37 may be provided with external threads 46 and 47 or means by which the unit may be connected with the apparatus to be protected.

The units described are connected with the concave faces of the diaphragm on the high pressure side and the convex side on the low pressure side so that the higher pressure acts against the concave side of the diaphragm and pressure is relieved, upon rupture, to the low pressure side through the members 4 and 37 as the case may be.

From the foregoing it is obvious that I have provided a safety device which is adapted to be assembled as a sealed unit at the factory. It is also obvious that the unit may be inexpensively constructed and supplied at low cost so that the units may be disposed of when the rupture member has functioned to relieve pressure differential and replaced with another factory sealed unit.

What I claim and desire to secure by Letters Patent is:

1. A safety unit including a socket member having a flow opening encircled by an outwardly tapering gripping face and having an inner cylindrical face concentric with the gripping face, a rupture member having a dome portion covering the flow opening and having an outwardly flaring flange portion seating on said tapering gripping face and joining with the dome portion in a rounding curve to provide an annular groove on the flange side of said rupture member, a plug member having a coaxial flow opening encircled by an annular rim portion closely engaging in said annular groove and having a tapering periphery conforming to the taper of the socket for seating the flange of the rupture member against the gripping face of the socket member when the rim portion is snug in said groove, said plug member having an annular body portion located within said socket member and directly engaging the cylindrical face of the socket member and forming an inwardly extending shoulder adjacent a surrounding rim of the socket member, and means on said rim of the socket member and extending over the shoulder to close the joint between the socket and plug members.

2. A safety unit including a socket member having a flow opening encircled by an outwardly tapering gripping face, a rupture member having a dome portion covering the flow opening and having an outwardly flaring flange portion seating on said tapering gripping face and joining with the dome portion in a rounding curve to provide an annular groove on the flange side of said rupture member, a plug member having a coaxial flow opening encircled by an annular rim portion closely engaging within said annular groove and having a tapering periphery conforming to the taper of the socket for seating the flange of the rupture member against the gripping face of the socket member when the rim portion is snug in said groove, said plug and socket members having interengaging cylindrical portions provided with interengaging projections and the plug member having an inwardly extending shoulder adjacent a surrounding terminal rim of the socket member, and means on said rim of the socket member and extending over the shoulder to close the joint between the socket and plug members.

3. A safety device including a socket member having an axial flow opening encircled by an internal gripping face tapering inwardly toward the axis of the opening, a rupture member having a dome portion covering the flow opening and having an outwardly flaring flange portion seating on said tapering gripping face and joining with the dome portion in a rounding curve to provide an annular groove on the flange side of the rupture member, and a plug member having a flow opening coaxial with the flow opening of the socket member and provided with a circumferential tapering body portion conforming with the taper of the internal gripping face of the socket member and seating within the socket member with the tapering portion bearing upon the flaring flange to cooperate with the gripping face to grip the flange therebetween, said body portion of the plug member having a rounding rim portion engaging within said annular groove of the rupture member and having an annular shoulder encircled by the annular rim portion of the socket member, said rim portion having an annular part in direct face to face contact with the annular shoulder to retain the plug member within the socket member.

ROY L. SIMPSON.

REFERENCES CITED

The following references are of record in the file of this patent:

UNITED STATES PATENTS

| Number | Name | Date |
| --- | --- | --- |
| 138,171 | Matthews | Apr. 22, 1873 |
| 1,446,585 | Riotte | Feb. 27, 1923 |
| 1,901,820 | Parker | Mar. 14, 1933 |
| 2,003,025 | Westerbeck | May 28, 1935 |
| 2,174,218 | Greene | Sept. 26, 1939 |
| 2,225,220 | Huff | Dec. 17, 1940 |
| 2,387,353 | Raymond | Oct. 23, 1945 |